United States Patent
Nolen

(10) Patent No.: US 11,247,853 B2
(45) Date of Patent: Feb. 15, 2022

(54) ROTARY AIRLOCK DEVICE AND SYSTEM FOR MOVING AND PLACING GRANULATE MATERIAL

(71) Applicant: Michael Nolen, Paramount, CA (US)

(72) Inventor: Michael Nolen, Paramount, CA (US)

( * ) Notice: Subject to any disclaimer, the term of this patent is extended or adjusted under 35 U.S.C. 154(b) by 0 days.

(21) Appl. No.: 17/012,026

(22) Filed: Sep. 3, 2020

(65) Prior Publication Data
US 2021/0070557 A1 Mar. 11, 2021

Related U.S. Application Data

(60) Provisional application No. 62/896,906, filed on Sep. 6, 2019.

(51) Int. Cl.
*B65G 53/08* (2006.01)
*B65G 53/46* (2006.01)

(52) U.S. Cl.
CPC ......... *B65G 53/08* (2013.01); *B65G 53/4608* (2013.01); *B65G 53/4691* (2013.01); *B65G 2201/042* (2013.01); *B65G 2812/1625* (2013.01)

(58) Field of Classification Search
CPC .... B65G 53/08; B65G 53/46; B65G 53/4608; B65G 53/4616; B65G 53/4691
See application file for complete search history.

(56) References Cited

U.S. PATENT DOCUMENTS

| | | | |
|---|---|---|---|
| 2,728,469 A | 12/1955 | Sonntag | |
| 3,076,580 A * | 2/1963 | Heath | B65G 53/32 406/63 |
| 3,378,309 A | 4/1968 | Copley et al. | |
| 3,995,777 A * | 12/1976 | Diez | G01F 11/22 222/370 |
| 4,907,402 A | 3/1990 | Pakosh | |
| 5,403,128 A | 4/1995 | Thomas | |
| 5,433,520 A | 7/1995 | Adams et al. | |
| 5,647,696 A | 7/1997 | Sperber | |
| 5,725,160 A | 3/1998 | Harper et al. | |
| 5,795,108 A * | 8/1998 | Lightle | B65G 53/12 406/123 |
| 5,992,699 A | 11/1999 | Johnson et al. | |
| 6,131,818 A | 10/2000 | White | |
| 6,290,150 B1 | 9/2001 | Jones | |
| 6,336,774 B1 | 1/2002 | Dunlop et al. | |
| 6,491,479 B1 | 12/2002 | Rexius | |
| 6,554,546 B2 | 4/2003 | Dunlop et al. | |
| 6,964,551 B1 | 11/2005 | Friesen | |
| 7,104,207 B2 | 9/2006 | Wake et al. | |
| 7,275,893 B2 * | 10/2007 | Rexius | B60P 1/60 406/197 |
| 7,303,362 B2 | 12/2007 | Dunlop et al. | |

(Continued)

*Primary Examiner* — William R Harp
(74) *Attorney, Agent, or Firm* — Eandi Fitzpatrick LLP

(57) ABSTRACT

A system for moving and placing granulate is provided together with a rotary airlock device. The system has a housing mountable to a trailer with cabinet located on a side of the housing with a compressor, at least one back compartment located on a back side of the housing. The compartment has a rotary airlock device in communication with the compressor. The compressor feeds air to the rotary airlock device under pressure, and an actuatable feeder located on the back side of the housing receives granulate and feeds the granulate to the rotary airlock device.

13 Claims, 10 Drawing Sheets

(56) References Cited

U.S. PATENT DOCUMENTS

| | | |
|---|---|---|
| 2006/0056924 A1* | 3/2006 | Jurkovich .............. B65G 53/66 |
| | | 406/39 |
| 2007/0177950 A1 | 8/2007 | Weisbrod |
| 2008/0038070 A1 | 2/2008 | Dunlop et al. |
| 2010/0282780 A1 | 11/2010 | Babiarz |
| 2012/0026258 A1 | 2/2012 | Leighton et al. |
| 2012/0056959 A1 | 3/2012 | Smith et al. |
| 2016/0257506 A1 | 9/2016 | Mallaley et al. |

* cited by examiner

ROTARY AIRLOCK DEVICE AND SYSTEM FOR MOVING AND PLACING GRANULATE MATERIAL

CROSS-REFERENCE TO RELATED APPLICATIONS

This application claims the benefit of U.S. Provisional Patent Application Ser. No. 62/896,906 filed Sep. 6, 2019, entitled Rotary Airlock Device for use with an Apparatus for Moving and Placing Granulate Material, the entire contents of which are incorporated by reference herein for all purposes.

FIELD OF THE INVENTION

The present invention generally relates to placement of granular materials. More specifically, the present invention relates to a rotary airlock device used in a system or apparatus that moves and places granulate.

BACKGROUND

Sand, gravel and rock are used in a variety of applications for the construction industry. From aggregate base for concrete slabs, to back fill for retaining walls, granular materials, or granulates, are probably the most widely used substance, outside of concrete, in the construction industry. What has been a common problem has been moving the granulate from place to place when a dump truck and/or cranes and mechanical shovels do not have easy access to the worksite.

Another application, namely the construction of concrete flatwork (slabs on grade and the like) typically require a 2- to 6-inch layer of sand, gravel or other granular material underneath a concrete slab. In these applications, a vapor barrier is often required in order to provide moisture protection. The material of choice for vapor barriers is typically of a size and material that is job-site-specific, and therefore delivered directly from the vendor to a location adjacent to the flatwork in progress. Since the vapor barrier and subsequent granulate installation are the final steps preceding the actual concrete pouring, they are not completed until all other mechanical, electrical lines and footing reinforcement bars have been installed. As such, heavy equipment cannot be driven over the pad (and lines and bars) because the lines and bars (and vapor barrier) would be disturbed. Because of this restriction, the granulate has heretofore been applied manually with wheelbarrows and shovels.

Furthermore, the process of concrete flatwork usually involves the installation of a perimeter forms for the slab (i.e. within which the concrete would be poured). These perimeter forms also interfere with the use of heavy equipment to load the granulate into the pad. What is needed is a device and method that permits the transfer of granulate into a concrete flatwork pad without disturbing the mechanical and electrical lines, the reinforcing bars, the vapor barrier or the perimeter forms.

A number of improvements have been made to mechanisms for the pumping of sand and gravel. U.S. Pat. No. 6,336,774 to Dunlap describes a portable, self-contained apparatus capable of discharging granulate into hard-to-reach areas, as well as providing assistance in covering vast open areas with granulate in a short time. The apparatus comprises a fully functional truck having a substantially flatbed upon which is mounted a high capacity air compressor. An air compressor, feeder/hopper, pumping device and the hose are provided. The feeder/hopper is configured to receive loads of granulate and then feed the granulate in a consistent manner into the attached pumping device for pneumatic compression into the hose. The hose is stored on a hydraulic or air driven reel which dispenses the hose for quick set-up and retracts it for ease of returning to storage on the truck.

As it relates to pumps generally, an ongoing problem experienced by placing flowable material, in particular materials like sand and gravel, is the extreme wear and tear these abrasive materials cause to these systems, and the differing sizes of the particulates. These abrasive materials rapidly break down and even destroy the parts of the handling systems and pumps. Additionally, even with various improvements a significant amount of inefficiencies exists in currently available systems. Leaks caused by the wear and tear of various parts of the system reduce significantly the operational characteristics of these systems. Furthermore, when the worksite is very far from where a truck can go, the pumping mechanism require sufficient power to pump the materials through a hose to the worksite.

Thus, what is needed is an improved pump/rotary airlock device to achieve a significant increase in the efficiencies of the system and reduce occurrence and frequency of equipment wear.

SUMMARY OF THE INVENTION

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

To achieve the foregoing and other aspects and in accordance with the embodiments, a system, apparatus and method for moving and placing granulate material, is provided.

Accordingly, the disclosure relates to a rotary airlock device or feeder for a portable, self-contained apparatus that is attachable to a motor vehicle (truck) capable of discharging granulate into hard-to-reach areas, as well as providing assistance in covering vast open areas with granulate in a short time.

The rotary airlock feeder and system permits the application of granulate into areas that are normally inaccessible and would require many hours of human labor, and thereby potentially avoiding damage to the site that might be incurred if employing a prior method and device.

The present system provides a rotary airlock mechanism or rotary airlock feeder, and a system mountable to a vehicle or trailer that is a "containerized" "boxed" or "cased" system mountable to a trailer. In this way, the system can be easily shipped and mounted to a trailer. The containerized system comprises operating components for the rotary airlock device and the software, hardware and firmware to operate the granulate moving system. One component of the system, the rotary airlock mechanism, comprises a rotary air lock chamber to move aggregates such as sand, rock, soil, through a hose and discharge at end users point of placement. The rotary airlock mechanism is configured to increase production rates and maximum aggregate size able to be pumped through hose. The device comprises a wear plate assembly, a rotor gasket assembly, a rotor plate assembly and a rotor component.

In embodiments, the rotary airlock feeder comprises a wear plate assembly comprising a bottom wear plate and a top wear plate, wherein the bottom wear plate attached to an upper part of a housing bowl, a rotor plate assembly comprises a first rotor plate and a second rotor plate, wherein the first rotor plate disposed above the bottom wear plate, and a rotor component disposed above the first rotor gasket, wherein the second rotor gasket disposed above the rotor component, wherein the second rotor plate is disposed above the second rotor gasket, wherein the top wear plate is disposed above the second rotor plate, wherein the rotary airlock feeder facilitates application of granulate into predetermined areas.

The first rotor plate and the second rotor plate comprise a plurality of chambers disposed therewith to facilitates the inflow and ejection the aggregate material deposited in chambers. The bottom wear plate is configured to protect the first rotary plate and the housing bowl. The first rotor gasket and the second rotor gasket are provided with a radial and circumferentially arrayed plurality of downwardly projecting flange portions to act as connection members. The gasket assembly and the wear plate assembly arrangement are configured to provide a mechanical and adhesive bond to the rotor component. In one embodiment, the housing bowl is mated to the bottom wear plate.

An upper end of housing comprises notches for fixing the bottom wear plate in place. The top wear plate comprises an air input line connected to a compressor to pump air into the rotary air lock to create pressure to pump the gravel down through the device and out of an output line. The top wear plate comprises a gravel drop to gravel drops and an exhaust to allow airflow of the chamber and release dust and particulate. The rotor component is connected to a hydraulic motor to spin the bowl and move particulate. The rotary airlock feeder is coupled to a feeder to receive granulates for pneumatic compression and discharge granulates into areas that are normally inaccessible. The rotary airlock feeder is configured to increase production rates and increase maximum aggregate size able to be pumped through hose connectable to the containerized system.

In another embodiment, a system for moving aggregate that is attachable to a trailer or truck such as medium duty or heavy-duty truck. The system comprises at least one of the rotatory airlock mechanisms, and multiple electronic and motor components disposed on the trailer in a containerized housing attachable to a truck. The container may comprise a user interface, a network interface module, an HMI module, an input/output module, an actuators/distance sensors module, a hydraulic motor, a safety module, a programmable logic controller (or PLC), and a manual control module. The control components that are mounted to trailer and are operable by a user.

In an embodiment, a system for moving and placing granulate, the system comprises a housing mountable to a trailer; at least one cabinet located on a side of the housing, wherein the at least one cabinet comprises a compressor; at least one back compartment located on the back side of the housing, wherein the at least one back compartment comprises at least one rotary airlock device in communication with the compressor, wherein the compressor feeds air to the rotary airlock device under pressure; an actuatable feeder located on the back side of the housing, wherein the feeder when in an open position receives granulate and feeds the granulate to the at least one rotary airlock device; a hose mount located on the housing and in communication with a bottom portion of the at least one rotary airlock, wherein when the compressor is actuated, the granulate is fed from the feeder, through the at least one rotary airlock and out through the house mount into a hose to place the granulate in a predetermined place.

In an embodiment, a rotary airlock feeder device comprising a wear plate assembly comprises a bottom wear plate and a top wear plate, wherein the bottom wear plate attached to an upper part of a housing bowl, wherein the top wear plat has a granulate input aperture; a rotary component comprising a rotary airlock chamber, wherein the rotary component is coupled to a motor and when actuated, rotates to provide a silo to increase pressure and move the granulate; a housing bowl positioned below the rotary component; an outlet assembly attached to housing bowl, wherein the outlet assembly a granulate outlet, and an air pipe coupled to the outlet assembly to provide an airflow to move granulate out of the outlet assembly.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

Figure 1A:
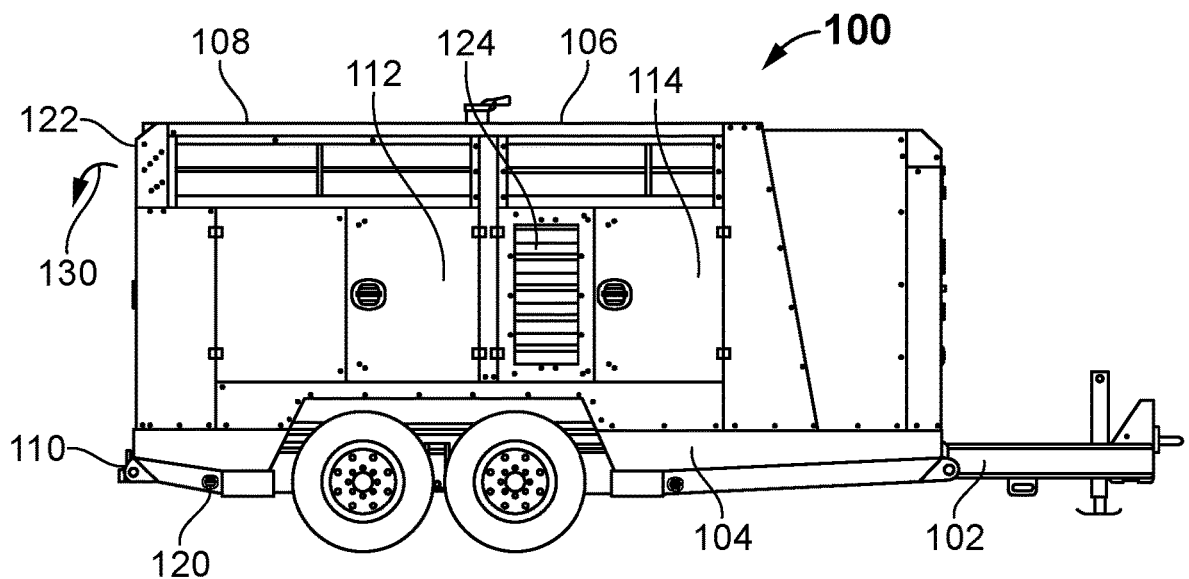
FIG. 1a illustrates an exemplary side view of a containerized system for moving and placing granulate material according to an embodiment of the present system.

Other features, advantages, and aspects of the present system will become more apparent and be more readily understood from the following detailed description, which should be read in conjunction with the accompanying drawings.

DETAILED DESCRIPTION OF THE INVENTION

The present invention is best understood by referencing the detailed figures and description set forth herein.

It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Embodiments of the invention are discussed below with reference to the examples. However, those skilled in the art will readily appreciate that the detailed description given herein with respect to these examples is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

For purposes of illustrating features of the embodiments, a simple example will now be introduced and referenced throughout the disclosure. Those skilled in the art will recognize that this example is illustrative and not limiting and is provided purely for explanatory purposes. An example of a computing system environment is disclosed. Any computing system environment is not intended to suggest any limitation as to the scope of use or functionality of the system and method described herein. Neither should the computing environment be interpreted as having any dependency or requirement relating to any one or combination of components illustrated in the exemplary operating environment.

Referring now to FIG. 1*a*, a side view of a system 100 for moving and placing granulate is shown. The disclosed system 100 is a portable, self-contained system capable of discharging granulate into hard-to-reach areas, as well as providing assistance in covering vast open areas with granulate in a short time. In embodiments, the system is containerized so that it can be coupled to a trailer. Furthermore, the system 100 and method described herein permit the application of granulate into areas that are normally inaccessible and would require many hours of human labor, thereby potentially avoiding damage to the site that might be incurred if employing a prior method, system or device. Still further, the present system and apparatus serve to provide discharge of granulate near or adjacent to retaining walls and underneath concrete flatwork.

The system 100 may be coupled to a trailer 102 having a truss 104 upon which the housing 106 is mounted. The housing 106 comprises components including but not limited to a high-capacity air compressor, a motor (e.g., hydraulic motor), and a programmable logic controller (PLC) 124 together with multiple sensor arrays 128 and manual override components. The system further comprises an openable feeder/hopper 122, and at least one rotary airlock device 210 (shown in FIG. 2) and a hose mount 120 in which output air flows and a hose is mountable to. The hose outputs granulate to the desired area. The system further comprises multiple cabinets 112 and 114 in which electronics such as the PLC 124 and manual overrides are disposed. A hitch 110 is also provided in case multiple systems are required.

In operation, the feeder/hopper 122 may be actuated downwardly according to arrow 130 to open and receive loads of granulate via the PLC 124. The granulate is filtered by size and is then output into the rotary airlock device 210 for pneumatic compression and output via house mount 120 for output of particulate. In embodiments, the feeder/hopper 122 may be attached to the back of the housing at an upper end above the rotary airlocks outside of any compartments.

Figure 1B:
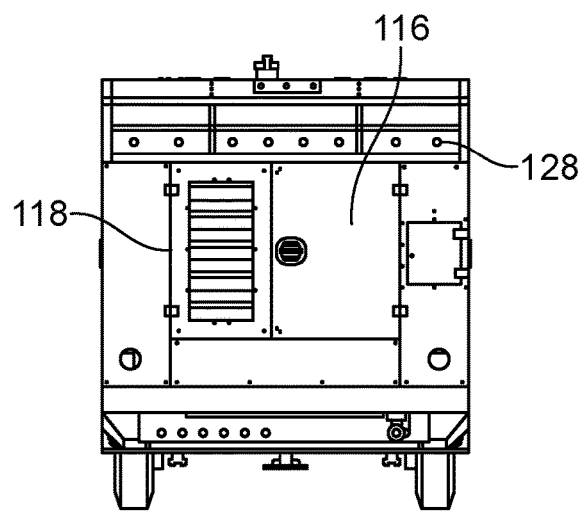
FIG. 1b illustrates an exemplary back view of a containerized system for moving and placing granulate material according to an embodiment of the present system.
Figure 10:
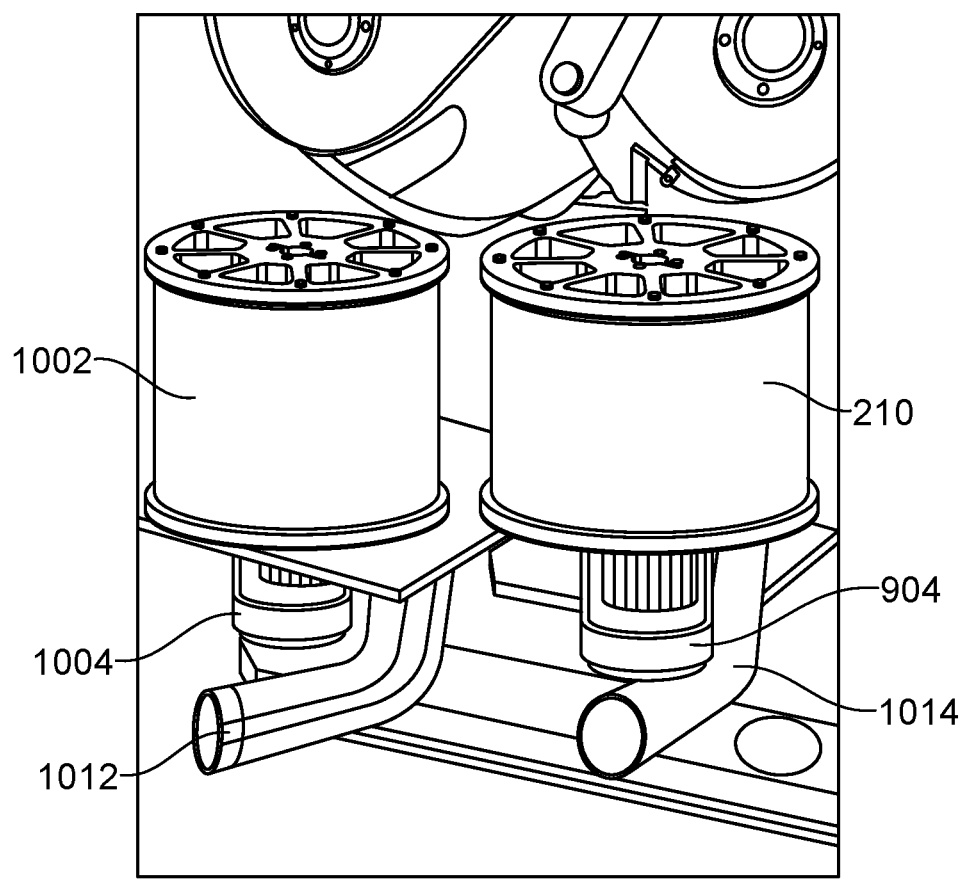
FIG. 10 illustrates an exemplary rear view of the container according to an embodiment of the present invention.

With reference to FIG. 1*b* a back view of the containerized system in a "closed" configuration is shown. The system comprises back compartments 116 and 118. The compartments may comprise the rotary airlock devices 210. The compartment 116 may comprise room for parts such as hoses. The compartment 116 comprises the airlock devices and feeder mechanisms to feed granulate the rotary device 210. In other embodiments, the rotary airlocks are located outside of the cabinet and are attached to the housing on the outside toward a back lower end as shown in FIG. 10.

Figure 2:
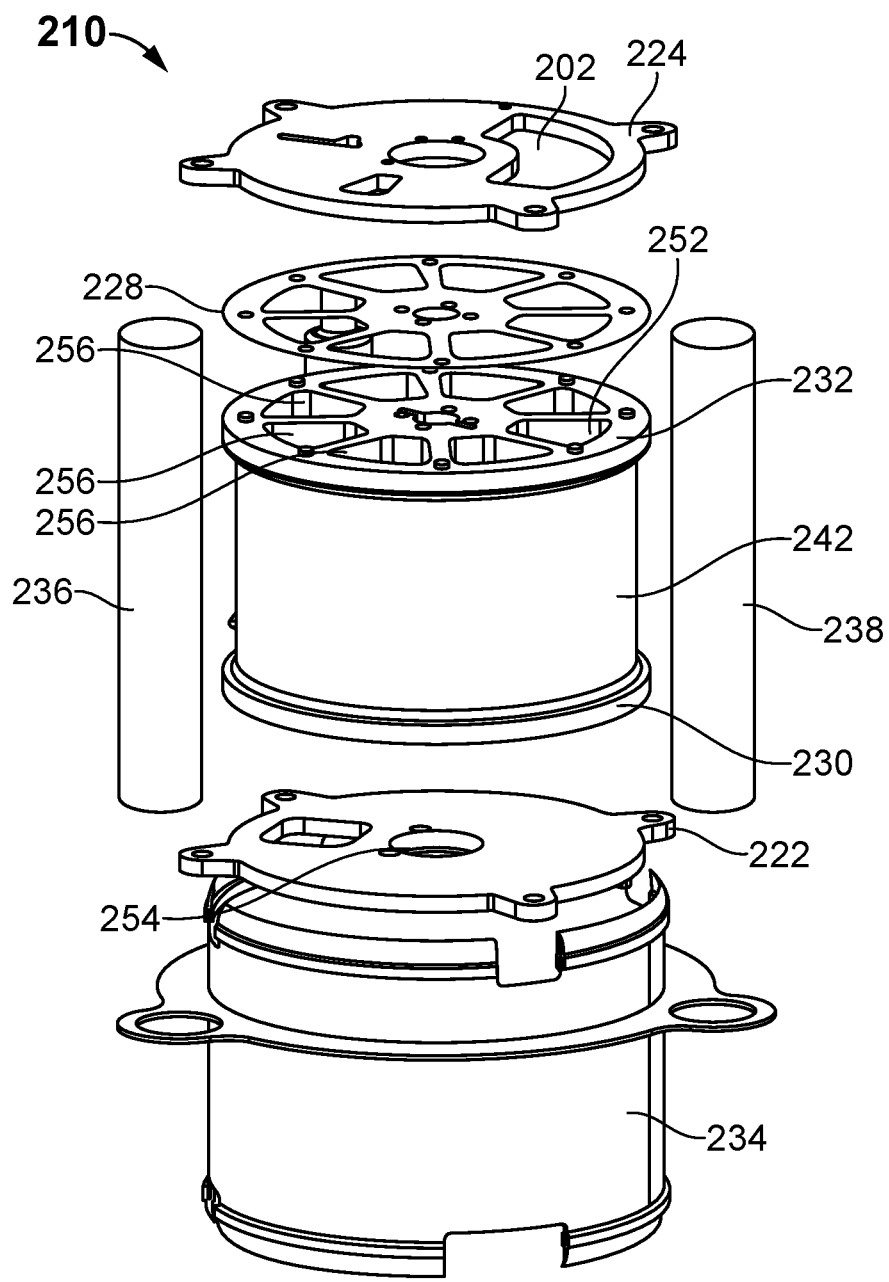
FIG. 2 illustrates an exemplary exploded view of a rotary air lock mechanism, according to an embodiment of the present system.

FIG. 2 illustrates an exploded view of the rotary airlock devices that is housed in the compartments of the system 100. The rotary airlock 210 is a pumping device. The rotary airlock device 210 comprises a rotary air lock chamber 252 (or plurality of chambers) to move aggregates such as sand, rock, soil, through a hose and discharge at the end users point of placement. In operation, the rotary airlock mechanism 210 is configured to increase production rates and maximum aggregate size able to be pumped through hose and reduce clogging. The rotary airlock mechanism 210 is configured to increase production rates in cubic yards, or tons per hour, whilst increasing maximum aggregate size able to be pumped through hose, that is larger than ⅜" or approximately one centimeter.

The functional components of the rotary airlock system 210 comprise a wear plate assembly (222 and 224), a rotor component 242. The rotor component 242 is configured as a material input or intake and rotates to silo the material until it rotates over the outlet chamber (shown in FIG. 3) for output. The wear plate assembly comprises a bottom wear plate 222, and a top wear plate 224. The bottom wear plate 222 is positioned at a lower portion of the rotary airlock 210, and may be manufactured from, for example, a duplex material composed of a chromium-tungsten carbide, austenitic alloy. However, other materials that are suitable may be used as well. The bottom wear plate 222 is configured to protect the lower rotary plate 230 and the housing bowl 234. The bottom wear plate 222 comprises an aperture 254 to allow material flow and to protect the rotor assembly itself.

The top wear plate 224 is positioned at a top portion of the rotary airlock 210, and like the bottom wear plate 222, may be manufactured from, for example, a duplex material composed of a chromium-tungsten carbide, austenitic alloy. However, other materials that are suitable may be used as well. The top wear plate 224 is configured to protect the upper rotary plate 232.

Still with reference to FIG. 2, the rotor 242 comprises a plurality of chambers 252 disposed therewith to eject the aggregate material deposited in the chambers. The chambers 252 in this embodiment are sized with an increase in volume compared to traditional assemblies. The rotor has an airlock seal, and is configured to lock air in as the air is discharged therethrough. In this way, the functional components of the rotary airlock system 210 are congruently arranged and keep materials and air in the form of a vacuum, until the rotor spins and aligns with an exhaust (shown in FIG. 4).

In operation, the bottom wear plate 222 is attached to an upper part of a housing bowl 234. A lower part of the rotor component 242 is attached to the rotor component 242. The bottom wear plate 222 and the top wear plate 224 are attached to the rotor component 242 via fasteners. The fasteners include, but are not limited to, clamp screws, screws, and bolts. The wearing plate assembly 222 and 224 arrangement and configuration are configured to provide mechanical and adhesive bond to the rotor components. In one embodiment, the rotor component 242, the rotor plate assembly (230, 232) and the rotor gasket assembly (shown in FIG. 8) comprise circumferentially arranged plurality of openings 256 which lead to chamber 252. The circumferentially arranged openings 256 of each assembly are congruent to one another. In operation, when granulate is fed into the rotary airlock via hopper, the granulate falls into the chamber of the bowl (to be discussed in more detail with reference to FIG. 6). While granulate is being deposited the rotor component 242 is rotating under power from a hydraulic drive that connects to the bottom of the device. In turn, as the rotor rotates each chamber is presented to a manifold so that high-pressure air from the air compressor via a hose hookup to conduit is introduced into the chamber 252. The high-pressure air is introduced through opening 202 and forces material located in chamber out through material ejection conduit (shown in FIG. 3). During operation, a pump hose, which can be up to several hundred feet long, is attached to the end of a conduit attached to housing bowl 234 and is used to place the stream of granulate generated by rotary air lock mechanism. The clamp screws 236 and 238 are provided to couple the elements together.

Figure 3:
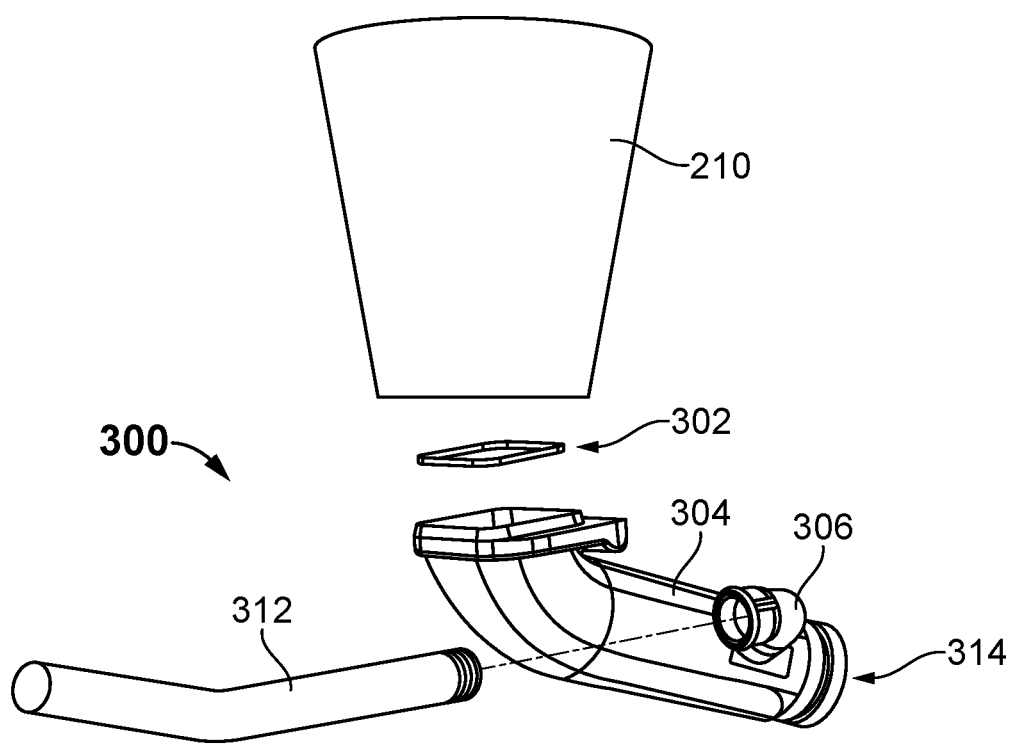
FIG. 3 illustrates an exemplary air outlet channel coupled to a pumping device, according to an embodiment of the present system.

Referring now to FIG. 3, an outlet assembly 300 is shown in which there is a second stream of compressed air that facilitates additional pumping force and obviates clogs. The outlet assembly 300 is positioned at a bottom end of the rotary airlock 210 and is in communication with the rotary airlock 210 such that granulate flows from the airlock to the outlet assembly 300. The outlet assembly comprises air and granulate outlet channel 304 coupled to the rotary airlock 210. A seal 302 is located at the end coupling the air and granulate outlet channel 304 and the rotary airlock 210. A coupling 306 (e.g., elbow connector) is located at a second end of the air and granulate outlet channel 304 to attach to hose outlet 1012 (shown in FIG. 10). An air pipe 312 is coupled to the air and granulate outlet channel 304 via an coupling 306 and may be coated with zinc. The air pipe 312 is coupled a compressor at one end and the air and granulate outlet channel 304 on the other end. The air outlet channel and granulate 304 comprises an aperture to which coupling 306 is connected to provide the additional stream of air. In operation, the air hose may be connected to the same compressor or a different compressor to provide power and pressure to the air outlet assembly 300 for discharging of granulate out of an end 314 of the air and granulate outlet channel 304 into hard-to-reach areas, as well as providing assistance in covering vast open areas with granulate in a short time.

Figure 4:
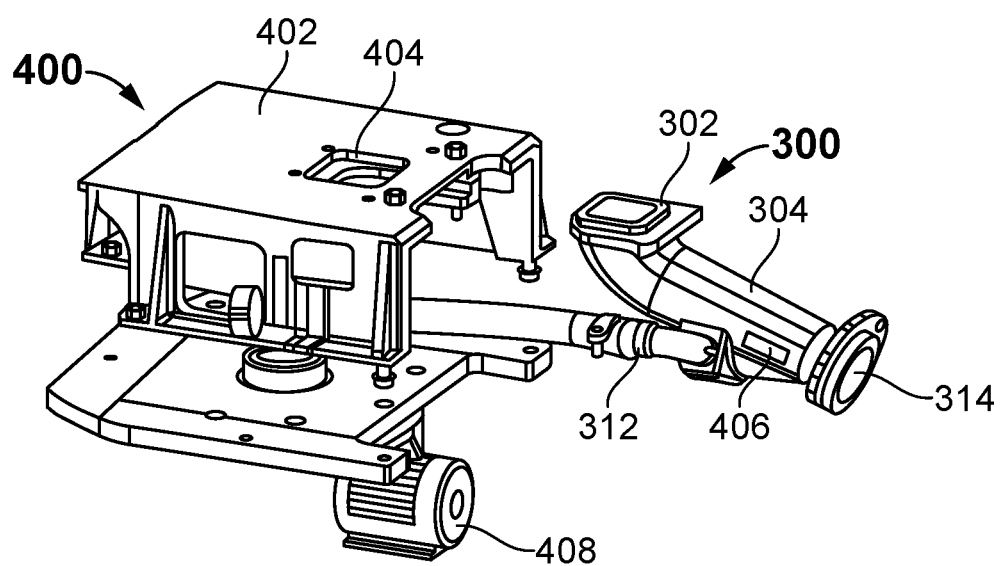
FIG. 4 illustrates an exemplary inlet assembly and motor arrangement, according to an embodiment of the present system.

Referring to FIG. 4, is a top perspective view of an arrangement 400 of the rotor set plate 402, motor 408 and an air inlet assembly 300 comprising an air inlet 406 is shown. The inlet 406 is configured to push matter downstream. A compressor or motor 408 is disposed at a first end of the air inlet 406. An optional gear box is located downstream. The rotor assembly 210 is coupled to set plate 402 so that matter passes through the rotor through aperture 404, out of inlet 302 via outlet channel 304.

Figure 5:
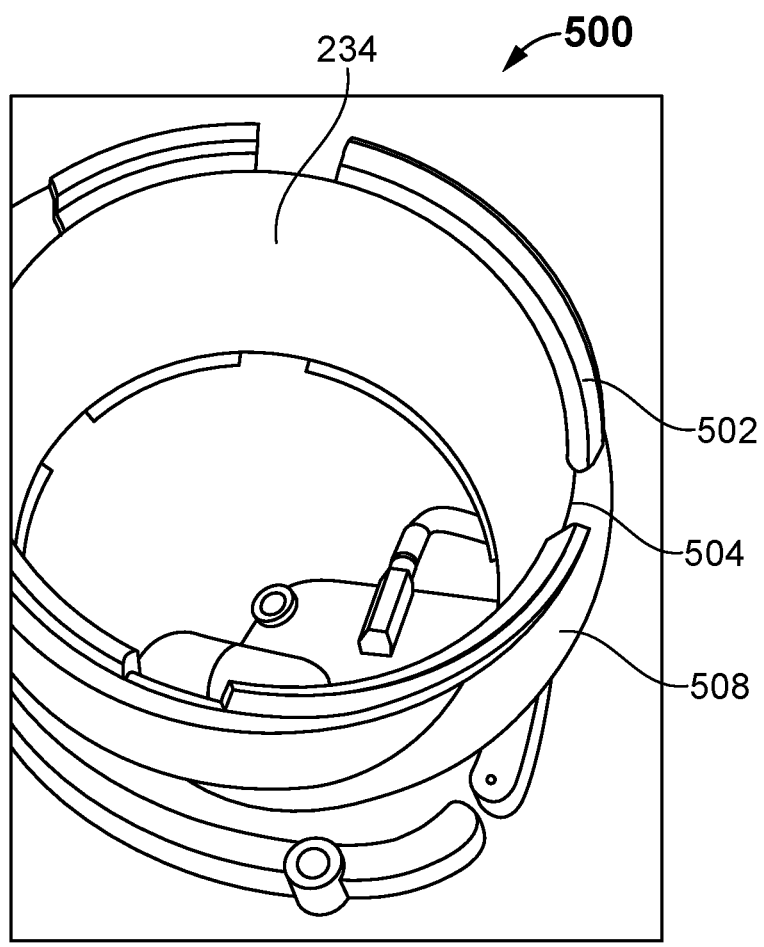
FIG. 5 illustrates an exemplary top view of a housing bowl, according to an embodiment of the present invention.

Referring to FIG. 5, a top perspective view of the housing bowl 234 is shown generally at 500. The housing bowl 234 is configured to act as a shield for internal components whilst keeping the granulate in the housing. A ring 508 extends from an exterior side of the housing bowl 234 providing a mating surface for wear plate assembly and connections via the clamp screws 236 and 238. An upper end of the housing includes notches 504 for fixing bottom wear plate 122 in place.

Figure 6:
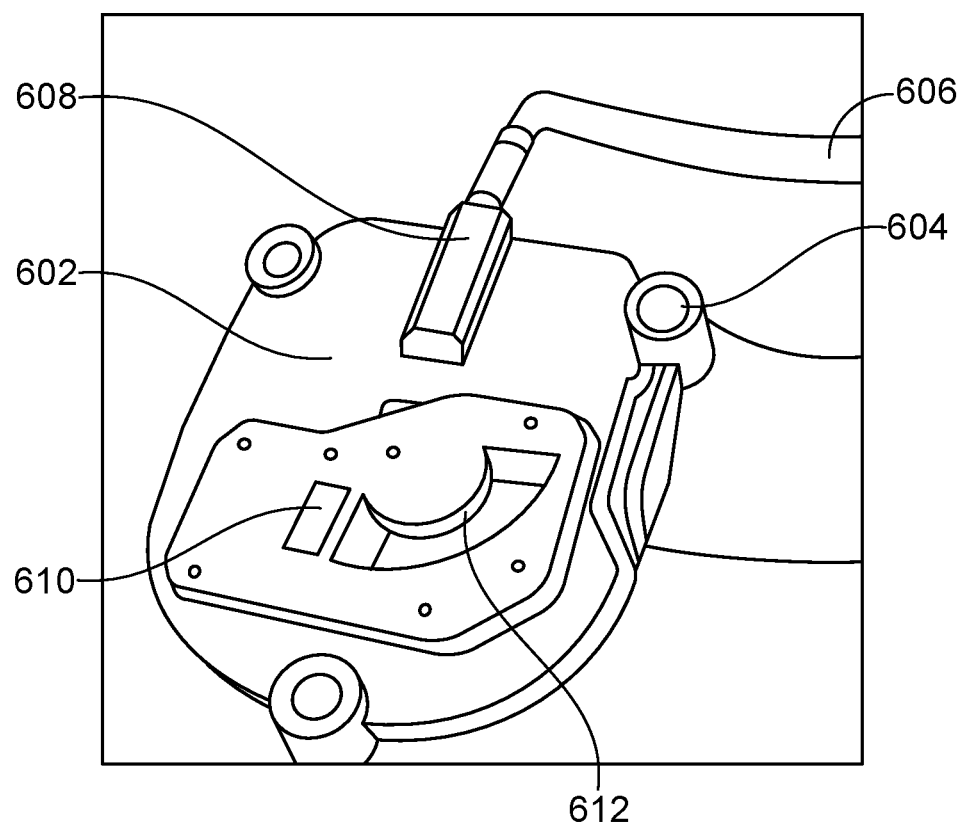
FIG. 6 illustrates an exemplary top perspective view of a lid, according to an embodiment of the present invention.

FIG. 6 illustrates an exemplary top perspective view of a top wear plate 224 (hereinafter referred to as lid 602 for purposes of this figure). An air input line 606 is connected to a compressor to pump air into the rotary air lock 210 to create pressure to pump the gravel down through the device and out of the hose output 1012 (shown in FIG. 10). A compressor is provided on the system 100 together with electronic components to operate the motor of the compressor. The lid further comprises a gravel drop aperture 612 configured to receive granulate dropped down from the hopper. The lid further comprises a connector output 608 to connect the lid to the inlet hosing. An aperture 610 is further provided exhaust during rotation of the rotor assembly. A bolt hole 604 is provided for mating components together.

Figure 7:
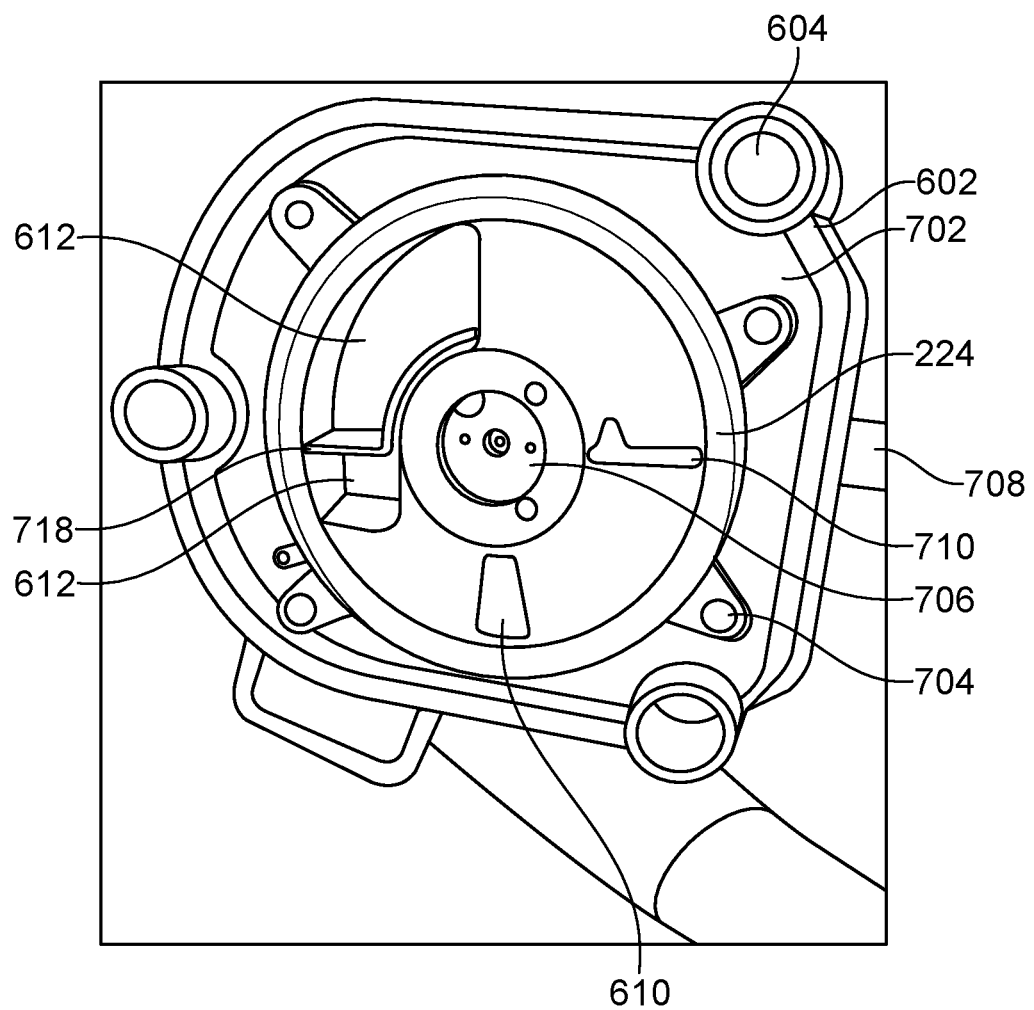
FIG. 7 illustrates an exemplary a rear view of the lid, according to an embodiment of the present invention.

With reference now to FIG. 7 an underneath view of the lid 602 according to an embodiment of the present invention is shown. The lid 602 is coupled to the wear plate 228 at the bottom side 702 of the lid 602 via a connector 704 to keep the wear plate 228 and lid 602 stationary. The gravel drop 612 and exhaust 610, are shown as well. The lid 602 further comprises additional exhaust conduit 612 to retrieve air pressure when the rotor 242 spins, air conduct 614 acts as a seal for a shot period as rotor 242 spins around spindle 710. Aperture 706 mates the lid 602 with the feed line 708 for air supply downward flange 718 is shown.

Figure 8:
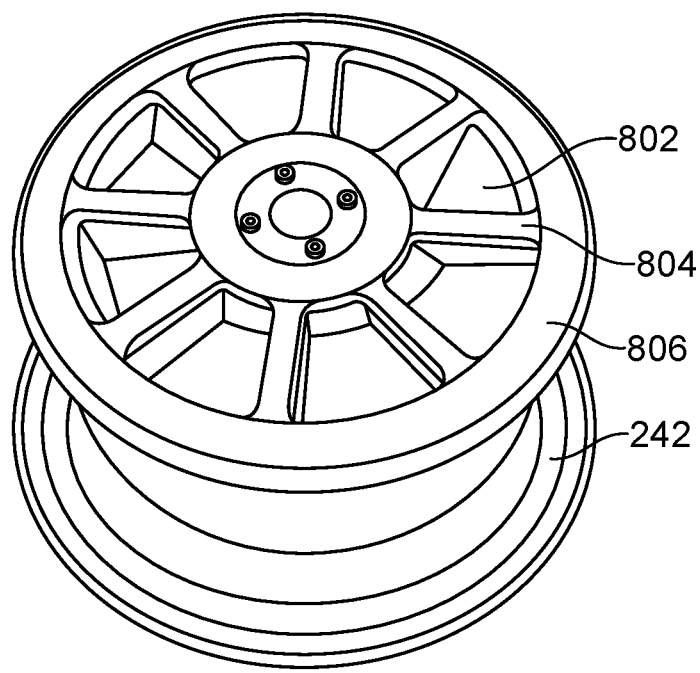
FIG. 8 illustrates an exemplary top perspective view of a rotor component or feed bowl, according to an embodiment of the present invention.

FIG. 8 illustrates a top perspective view of the rotor component 242 or feed bowl according to an embodiment of the present invention. In operations, the rotor component 242 rotates generate sifting and a pressure variant. A hydraulic motor the in housing 114 on the truck 102 provides power to rotate the rotor component 242. The rotor component 242 comprises gravel ducts 802 (or chambers 232 or openings 256 with reference to FIG. 2) to allow granulate to flow therethrough. The rotor component further comprises spindles 804 for support and a rubber gasket 806 for further protection and sealing. The ducts, because they allow for direct granulate feed and thus do not clog in a fashion that a U-shape duct would. In operation, the hydraulic motor rotates the feed bowl and is driven by hydraulic fluid from the truck to connect to the hydraulic power unit. Only one gear and bearing are required for rotation of the system and that can be sealed within the hydraulic system. Use of the hydraulic drive also eliminates most of the noise and the speed of rotation can be easily controlled by the flow of hydraulic fluid eliminating the need for gears of various ratios. Use of hydraulic motors, pumps and valves to control and power of most if not all of the systems results in costs savings and a significant reduction in noise and dust created by conventional systems that use noisy air driven motors, chains and gear drives.

Figure 9:
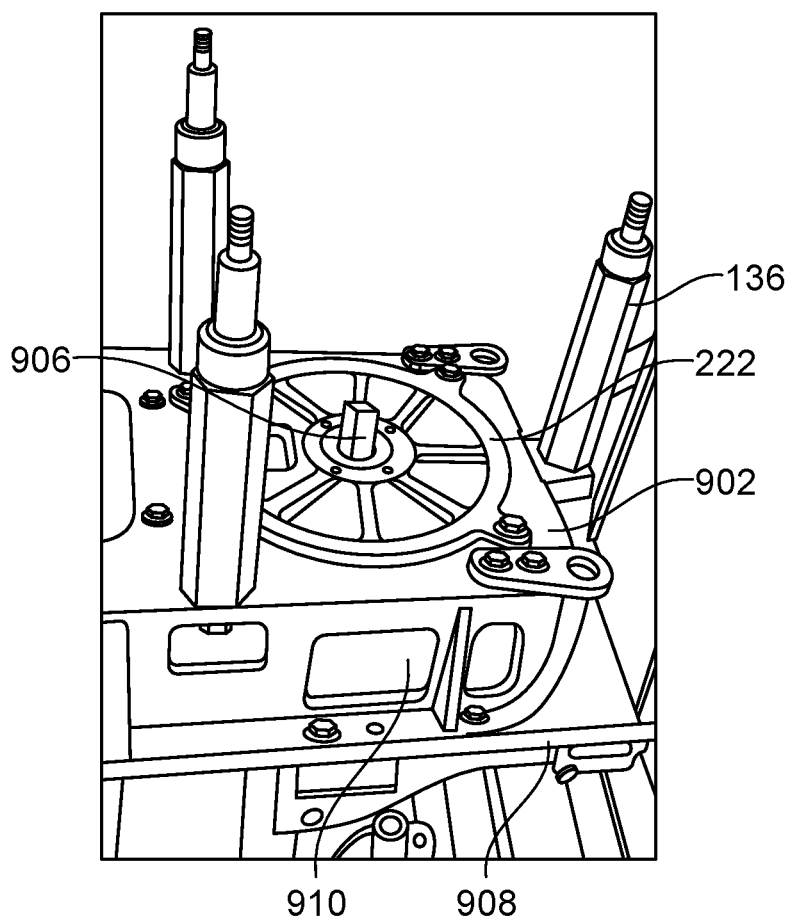
FIG. 9 illustrates an exemplary bottom portion of the rotor component, according to an embodiment of the present invention.

Referring now to FIG. 9 an exemplary bottom portion of the rotor component 242 according to an embodiment of the present invention is shown. As shown, the device comprises bearing 906, bottom casing 902, hollow interior 904, attachment fixture 908, and interior bore 910. The bearing 906 is configured to attach the rotor component 238 to the bottom assembly and casing and allows for rotation of the rotor component connection to hydraulic motor. The hollow interior 904 provides a space for connection of the hydraulic motor to provide power to the device. The attachment fixture 908 is provided for attaching device to the trailer (or truck).

FIG. 10 illustrates an exemplary rear view of the system 100 having back compartment open to expose the rotary airlocks according to an embodiment of the present invention.

In embodiments, system comprises two rotary airlock mechanisms including a first rotary airlock 210, a second rotary airlock 1002. FIG. 10 illustrates exemplary hose outlets (1012, 1014) of trailer 102 of FIG. 10, according to an embodiment of the present invention. The rotary mechanisms (1006, 1008) attached to a rear side of the trailer 102. A hollow interior 1004 provides a space for connection of the hydraulic motor to provide power to the device.

Preferred embodiments of this invention are described herein, including the best mode known to the inventors for carrying out the invention. It should be understood that the illustrated embodiments are exemplary only and should not be taken as limiting the scope of the invention.

Although specific features of various embodiments of the invention may be shown in some drawings and not in others, this is for convenience only. In accordance with the principles of the invention, the feature(s) of one drawing may be combined with any or all of the features in any of the other drawings. The words "including," "comprising," "having," and "with" as used herein are to be interpreted broadly and comprehensively, and are not limited to any physical interconnection. Moreover, any embodiments disclosed herein are not to be interpreted as the only possible embodiments. Rather, modifications and other embodiments are intended to be included within the scope of the appended claims.

I claim:

1. A system for moving and placing granulate, the system comprising:
    a housing mountable to a vehicle, trailer or both;
    at least one cabinet located on a side or back side of the housing, wherein the at least one cabinet comprises a compressor;
    at least one rotary airlock device located at a back end of the housing, wherein the at least one rotary airlock is in communication with the compressor, and wherein the compressor feeds air under pressure to the at least one rotary airlock device;
    an actuatable feeder located on the back side of the housing, wherein the feeder, when in an open position, is configured to receive granulate and feed the granulate to the at least one rotary airlock device, and wherein the feeder is actuatable downwardly to the open position, and is actuatable upwardly to a closed position when not in use;
    a hose mount located on the housing and in communication with a bottom portion of the at least one rotary airlock device, wherein when the compressor is actuated, the granulate is fed from the actuatable feeder, through the at least one rotary airlock device and out through the hose mount into a hose to place the granulate in a predetermined place.

2. The system of claim 1, wherein the at least one rotary airlock device comprises two rotary airlock devices in parallel and in communication with each other to an increase in pressure in the system.

3. The system of claim 1, wherein the at least one cabinet comprises:
    a motor to power the at least one rotary airlock device to rotate;
    a programmable logic controller (PLC); and
    multiple sensor arrays coupled to the PLC to sense an amount of the granulate the system is moving.

4. The system of claim 1, further comprising at least one back compartment located on the back side or a side of the housing, wherein the at least one back compartment comprises the at least one rotary airlock device.

5. A rotary airlock device attachable to a housing, the rotary airlock device comprising:
    a wear plate assembly comprising a bottom wear plate and a top wear plate;
    a rotor component comprising a rotary airlock chamber, wherein the rotor component is coupled to a motor and when actuated, rotates to provide a first airflow and a silo to increase a pressure in the rotary airlock chamber, wherein the rotor component is configured to move the granulate through the rotary airlock chamber;
    a housing bowl positioned below the rotary component, wherein the housing bowl comprises a ring extending from an exterior side of the housing bowl providing a mating surface for the bottom wear plate;
    an outlet assembly coupled to the housing bowl, wherein the outlet assembly comprises:
        an air and granulate outlet;
        an air pipe coupled to the air and granulate outlet wherein the air pipe is configured to provide a second airflow to move the granulate out of the outlet assembly.

6. The device of claim 5, wherein the bottom wear plate is configured to protect the housing bowl, and wherein the top wear plate is configured to protect the rotor component, wherein each of the bottom wear plate and the top wear plate further comprises an aperture to allow granulate to pass therethrough.

7. The device of claim 6, further comprising a rotor set plate to couple the rotary airlock device thereto.

8. The device of claim 5, wherein the rotary airlock chamber comprises a plurality of chambers in the rotor component, wherein the plurality of rotary airlock chambers are configured move the granulate therethrough based on an increased pressure in the plurality of rotary airlock chambers.

9. The device of claim 5, wherein the wear plate assembly and the housing bowl are congruently arranged.

10. The device of claim 5, wherein the top wear plate comprises an air input line connected to a compressor to pump air into the rotary air lock device to create the pressure to pump the granulate down through the device and out of the air and granulate outlet.

11. The device of claim 10, wherein the air pipe is further coupled to the compressor to provide the second airflow.

12. The device of claim 5, wherein the rotor component is connected to a hydraulic motor.

13. The device of claim 5, wherein the air pipe is coupled to the air and granulate outlet using an elbow connector attached to a second end of the air and granulate outlet channel.

* * * * *